United States Patent
Barkan et al.

(10) Patent No.: US 6,817,529 B2
(45) Date of Patent: Nov. 16, 2004

(54) HAND-HELD BAR CODE READER WITH SINGLE PRINTED CIRCUIT BOARD

(75) Inventors: Edward Barkan, Miller Place, NY (US); Mark Drzymala, Commack, NY (US); Yajun Li, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/603,465

(22) Filed: Jun. 25, 2003

(65) Prior Publication Data

US 2004/0089720 A1 May 13, 2004

Related U.S. Application Data

(60) Continuation of application No. 10/158,091, filed on May 30, 2002, now Pat. No. 6,592,040, which is a continuation-in-part of application No. 09/542,381, filed on Apr. 4, 2000, now Pat. No. 6,607,132, which is a division of application No. 09/045,427, filed on Mar. 20, 1998, now Pat. No. 6,186,400.

(51) Int. Cl.[7] ................................................. G06K 7/10
(52) U.S. Cl. ......................... 235/472.01; 235/462.47; 235/462.43; 235/462.45; 235/462.36
(58) Field of Search ...................... 235/472.01, 462.47, 235/462.43, 462.36, 462.38, 462.45

(56) References Cited

U.S. PATENT DOCUMENTS

| | | | | |
|---|---|---|---|---|
| 4,684,202 A | * | 8/1987 | House et al. | 439/752 |
| 5,420,713 A | * | 5/1995 | Kunii | 359/198 |
| 5,581,067 A | * | 12/1996 | Grosfeld et al. | 235/462.36 |
| 5,629,510 A | * | 5/1997 | Quinn et al. | 235/462.36 |
| 6,414,777 B1 | * | 7/2002 | Miyamoto | 359/198 |

* cited by examiner

*Primary Examiner*—Karl D. Frech
*Assistant Examiner*—Daniel Walsh
(74) *Attorney, Agent, or Firm*—Kirschstein, et al.

(57) ABSTRACT

A hand-held bar code reader including a housing bounding an interior, a window, a generally planar printed circuit board mounted in the interior, and an optical scanning assembly mounted on the board and including a scanner for directing a light beam through the window at an acute angle relative to the board. A scanning element of the reader is manufactured by spacing a first and second support element apart by a gap bounded by edges of the support elements; injection molding a curable, elastomeric material in flowable form over the edges and into the gap; and allowing the curable, elastomeric material to cure and bond to the edges, and form a flexible hinge in the gap for enabling movement of the support elements relative to one another both away from and toward a stable rest initial position.

10 Claims, 4 Drawing Sheets

HAND-HELD BAR CODE READER WITH SINGLE PRINTED CIRCUIT BOARD

REFERENCE TO RELATED APPLICATIONS

This application is a continuation-in-part of U.S. patent application Ser. No. 10/158,091, filed May 30, 2002, now U.S. Pat. No. 6,592,040 which is a continuation-in-part of U.S. patent application Ser. No. 09/542,381, filed Apr. 4, 2000, now U.S. Pat. No. 6,607,132 which is a division of U.S. patent application Ser. No. 09/045,427, filed Mar. 20, 1998, now U.S. Pat. No. 6,186,400.

BACKGROUND OF THE INVENTION

1. Field of the Invention

The invention relates to optical scanners for bar code reading and in particular to the mechanical structure and ergonomics of a hand-held bar code reader.

2. Description of the Related Art

Various optical scanning systems and readers have been developed heretofore for reading indicia such as bar code symbols appearing on a label or on the surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the spatial pattern represented by the graphic indicia into a time-varying electrical signal, which is in turn decoded into data which represent the information or characters encoded in the indicia that are intended to be descriptive of the article or some characteristic thereof. Such data is typically represented in digital form and utilized as an input to a data processing system for applications in point-of-sale processing, inventory control, distribution, transportation and logistics, and the like. Scanning systems and readers of this general type have been disclosed, for example, in U.S. Pat. Nos. 4,251,798; 4,369,361; 4,387,297; 4,409,470; 4,760,248; 4,896,026; 5,015,833; 5,262,627; 5,504,316; 5,625,483; and 6,123,265, all of which have been assigned to the same assignee as the instant application and each of which is hereby incorporated by reference herein. As disclosed in some of the above patents, one embodiment of such a scanning system resides, inter alia, in a hand-held, portable laser scanning device supported by a user, which is configured to allow the user to aim a scanning head of the device, and more particularly, a light beam, at a targeted symbol to be read. U.S. Pat. No. 6,123,265 discloses resilient supports for defining a resting surface for the device.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at the target distance. It is often preferred that the cross-section of the beam spot measured in the scanning direction at the target distance be approximately the same as the minimum width in the scanning direction between regions of different light reflectivity, i.e., the bars and spaces of the symbol. Although typical readers utilize a single laser source, other bar code readers have been proposed with two or more light sources of different characteristics, e.g., different frequencies.

In the laser beam scanning systems known in the art, a single laser light beam is directed by a lens or other optical components along a light path toward a target that includes a bar code symbol on the target surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or do both. The laser beam may be moved by optical or opto-mechanical means to produce a scanning light beam. Such action may be performed by either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 to Krichever et al. describes laser, optical and sensor components mounted on a drive for repetitive reciprocating motion either about an axis or in a plane to effect scanning of the laser beam.

Another type of bar code scanner employs electronic means for causing the light beam to be deflected and thereby scan a bar code symbol, rather than using a mechanical motion to move or deflect the beam. For example, a linear array of closely spaced light sources activated one at a time in a regular sequence may be transmitted to the bar code symbol to simulate a scanned beam for a single source. Instead of a single linear array of light sources, a multiple-line array may also be employed, producing multiple scan lines. Such type of bar code reader is disclosed in U.S. Pat. No. 5,258,605 to Metlitsky et al.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol, detected, and converted into an electrical signal.

In retroreflective light collection, a single optical component, e.g., a reciprocally oscillatory mirror, such as described in U.S. Pat. No. 4,816,661 or U.S. Pat. No. 4,409,470, both herein incorporated by reference, and Ser. No. 08/727,944, filed Oct. 9, 1996, scans the beam across a target surface and directs the collected light to a detector. The mirror surface usually is relatively large to receive as much incoming light as is possible, only a small detector being required since the mirror can focus the light onto a small detector surface, which increases signal-to-noise ratio.

Of course, small scan elements are preferable because of the reduced energy consumption and increased frequency response. When the scan element becomes sufficiently small, however, the area of the scanning mirror can no longer be used as the aperture for the received light. One solution is to use a staring detection system (a non-retroreflective system) which receives a light signal from the entire field which the scanned laser spot covers.

In non-retroreflective light collection, the reflected laser light is not collected by the same optical component used for scanning. Instead, the detector is independent of the scanning beam, and is typically constructed to have a large field of view so that the reflected laser light traces across the surface of the detector. Because the scanning optical component, such as a rotating mirror, need only handle the outgoing light beam, it can be made much smaller. On the other hand, the detector must be relatively large in order to receive the incoming light beam from all locations in the scanned field.

Electronic circuitry and software decode the electrical signal into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process of bar code reading systems usually works in the following way. The analog signal from the sensor or photodectector may initially be filtered and processed by circuitry and/or software. The pulse width modulated digitized signal is applied to a software algorithm, which attempts to decode the signal. If the start and stop characters and the characters between them in the scan were decoded successfully and completely, the decoding process terminates and an indicator of a successful read (such as a green light and/or audible beep) is provided to the user. Otherwise, the decoder receives the next scan, and performs another decode according to a symbology specification into a binary representation of the data encoded in the symbol, and to the alphanumeric characters so represented.

The binary data is communicated to a host computer by an interface cable or wireless communication link. The interface cable may be a "smart cable" such as that described in U.S. Pat. Nos. 5,664,229 and 5,675,139, the contents of which are hereby incorporated by reference herein.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) per unit length is referred to as the density of the symbol. To encode the desired sequence of the characters, a collection of element arrangements is concatenated together to form the complete bar code symbol, with each character of the message being represented by its own corresponding group of elements. In some symbologies, a unique "start" and "stop" character is used to indicate when the bar code begins and ends. A number of different bar code symbologies is in widespread use including UPC/EAN, Code 39, Code 128, Codeabar, and Interleaved 2 of 5.

In order to increase the amount of data that can be represented or stored on a given amount of surface area, several more compact bar code symbologies have been developed. One of these code standards, Code 49, exemplifies a "two-dimensional" symbol by reducing the vertical height of a one-dimensional symbol, and then stacking distinct rows of such one-dimensional symbols, so that information is encoded both vertically as well as horizontally. That is, in Code 49, there are several rows of bar and space patterns, instead of only one row as in a "one-dimensional" symbol. The structure of Code 49 is described in U.S. Pat. No. 4,794,239. Another two-dimensional symbology, known as "PDF417", is described in U.S. Pat. No. 5,304,786.

Still other symbologies have been developed in which the symbol is comprised not of stacked rows, but of a matrix array made up of hexagonal, square, polygonal and/or other geometric shapes, lines, or dots. Such symbols are described in, for example, U.S. Pat. Nos. 5,276,315 and 4,794,239. Such matrix code symbologies may include Vericode, Datacode, and MAXICODE.

Moving-beam laser scanners are not the only type of optical instruments capable of reading bar code symbols. Another type of bar code reader is an imager, which incorporates detectors based on solid state imaging arrays or charge coupled device (CCD) technology. In such prior art readers, the size of the detector is typically smaller than the symbol to be read because of the image reduction by an objective lens in front of the array or CCD. The entire symbol is flooded with light from a light source, such as light emitting diodes (LED), and each cell or pixel in the array is sequentially read out to determine the presence of a bar or a space in the field of view of that cell.

The working range of CCD bar code scanners is rather limited as compared to laser-based scanners and is especially low for CCD based scanners with an LED illumination source. Other features of CCD based bar code scanners are set forth in U.S. Pat. No. 5,396,054 which is hereby incorporated by reference, and in U.S. Pat. No. 5,210,398. These references are illustrative of the certain technological techniques proposed for use in CCD type scanners to acquire and read indicia in which information is arranged in a two-dimensional pattern. CCD readers may be used in conjunction with moving-beam laser scanners for bar code reading, such as described in U.S. Pat. No. 5,672,858, the contents of which are hereby incorporated by reference herein.

In addition, there are currently two different types of CMOS imagers known today, active pixel sensor (APS) and active column sensor (ACS) imagers. APS CMOS imagers are constructed by placing an amplifier inside each pixel. The placement of the amplifier inside each pixel reduces the light gathering portion of the pixel, i.e., the fill factor of each pixel, and reduces the dynamic range of the pixel. In addition, variations in the manufacturing prices of APS CMOS imagers cause a fluctuation in the gain and offset of each of the amplifiers. These fluctuations may result in each pixel responding differently to the same amount of input light. The different responses of each pixel can create noise.

ACS CMOS imagers employ a true unity gain amplifier which is shared by each pixel in each column of pixels. As compared to APS CMOS imagers, ACS CMOS imagers use only an input transistor inside each pixel. APS CMOS imagers' use of only an input transistor inside each pixel, as compared to the use of an amplifier inside each pixel as in APS CMOS imagers, increases the fill factor and dynamic range of the imagers.

SUMMARY OF THE INVENTION

1. Objects of the Invention

It is a general object of the present invention to provide an improved mechanical printed circuit support structure for a small, lightweight bar code reader.

It is another object of the invention to provide a bar code reader implemented on a single printed circuit board.

It is a further object of the present invention to provide a bar code reader with a scan assembly mounted on a single circuit board which extends through a handle of the reader.

It is an even further object of the invention to provide a method which can be used to accomplish one or more of the above objects.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

2. Features of the Invention

In keeping with these objects, and others which will become apparent hereinafter, one feature of this invention resides, briefly stated, in a hand-held scanning device comprising: a housing having walls bounding an interior, and a window; a generally planar printed circuit board mounted in the interior; and an optical scanning assembly mounted on the board and including a scanner for directing a light beam through the window at an angle relative to the board exteriorly of the housing to an indicium to be scanned, and a detector for detecting light reflected from the indicium being scanned and for providing data signals representative of the indicium.

The hand-held scanning device of this invention includes a housing having a hollow body portion, and a hollow handle portion connected to, and extending away from, the body portion; a generally planar, single printed circuit board mounted in a generally upright stance within the housing and extending between the body and handle portions; and a scanning assembly mounted on a first side of the board, and operative for scanning a light beam through an aperture in the board and exteriorly of the housing between a pair of opposite scan end-limiting positions across an indicium having parts of different light reflectivity to be scanned. Preferably, the board lies in a generally vertical plane that is at an angle to an intermediate scan position of the light beam, said intermediate scan position lying between the scan end-limiting positions.

Another feature of this invention resides in a method of making a movable scan element for supporting a mirror for scanning light in a laser scanning bar code reader, comprising the steps of: spacing a first and a second support element by a gap bounded by edges of the support elements; injection molding a curable, elastomeric material in flowable form over the edges and into the gap; and allowing the curable, elastomeric material to cure and bond to the edges, and form a flexible hinge in the gap for enabling movement of the support elements relative to one another both away from and toward a stable rest initial position.

The novel features and characteristics of the invention are set forth in the appended claims. The invention itself, however, as well as other features and advantages thereof, will be best understood by reference to a detailed description of specific embodiments, when read in conjunction with the accompanying drawings.

DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also other one- or two-dimensional graphic patterns, as well as alphanumeric characters. In general, the term "indicia" may apply to a type of pattern or information which may be recognized or identified by scanning a light beam and by detecting reflected or scattered light as a representation of variations in light reflectivity at various points of the pattern or information. A bar code symbol is one example of an "indicia" which the present invention can scan.

Figure 1:
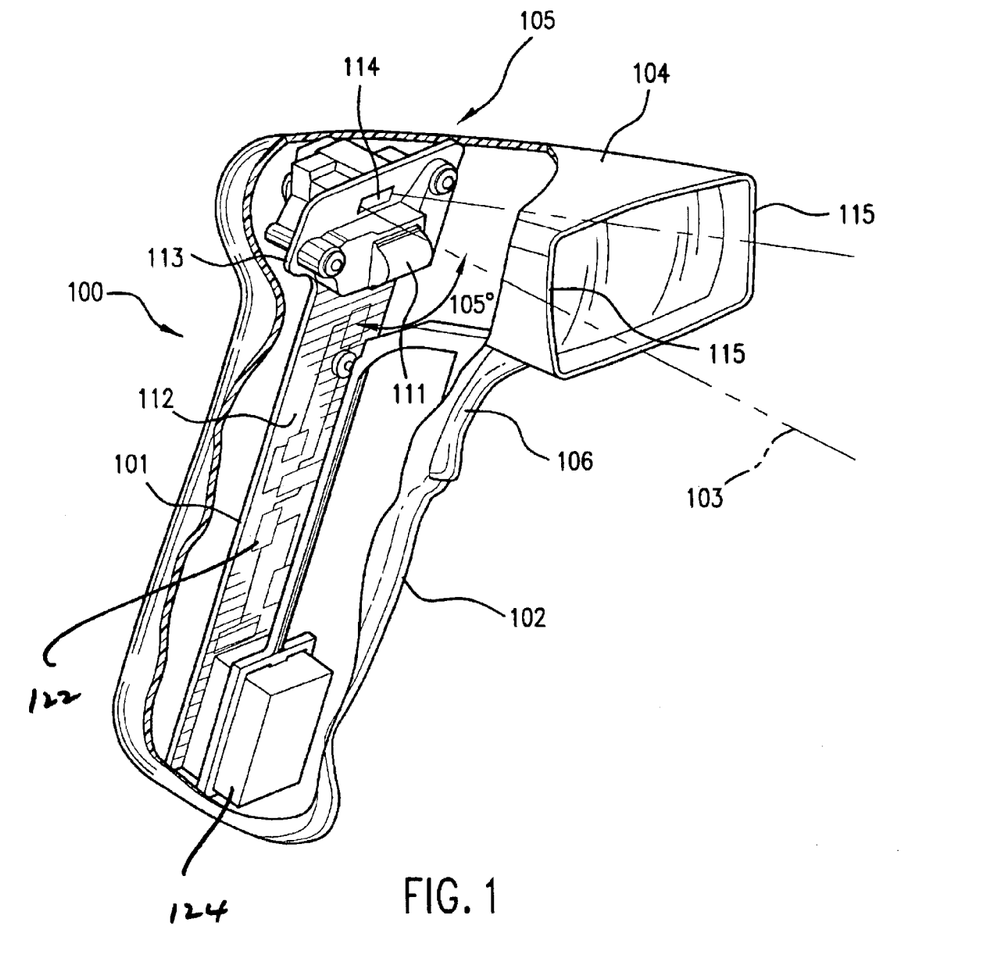
FIG. 1 is a cutaway, perspective view of a triggered bar code reader according to the present invention.

As a preferred embodiment, we describe the implementation of the present invention in a laser-scanning, bar code reading unit similar to the hand-held reader illustrated in FIG. 1. The device of FIG. 1 is generally of the style disclosed in U.S. Pat. No. 6,186,400 assigned to Symbol Technologies, Inc. and hereby incorporated by reference, and also similar to the configuration of a bar code reader commercially available as part number LS 4000 or LS 1900 from Symbol Technologies, Inc. of Holtsville, N.Y. Alternatively, or in addition, features of U.S. Pat. Nos. 4,387,297 and 4,760,248 issued to Swartz et al., or U.S. Pat. No. 4,409,470 issued to Shepard et al., both such patents being assigned to Symbol Technologies, Inc., may be employed in constructing the bar code reader unit of FIG. 1. These U.S. Pat. Nos. 4,760,248, 4,387,297 and 4,409,470 are incorporated herein by reference.

FIG. 1 shows the overall layout and design of the reader 100. There is a single printed circuit board (PCB) 101 that slides into a housing handle 102 in a generally vertical or upright fashion. The PCB is oriented at a 105° angle relative to a horizontal plane. The housing is shown only as a cutaway outline. The housing consists of the handle 102 and a barrel or canopy 104 molded in a fashion similar to that known in the art. The PCB supports a scan engine 105, a trigger switch 106, and related electronics 122 connected to a controller 124. The scan engine is a non-retro system with a collection assembly 120 on a front side 112 of the PCB and a scan assembly 300 on a rear side 113 of the PCB. This allows the laser beam scanning field to be closely matched with the collection field. The outgoing laser beam passes through a slot 114 in the PCB and is clipped by the exit window edges 115 of the housing so it is usable almost to the end of the scan line.

Figure 2:
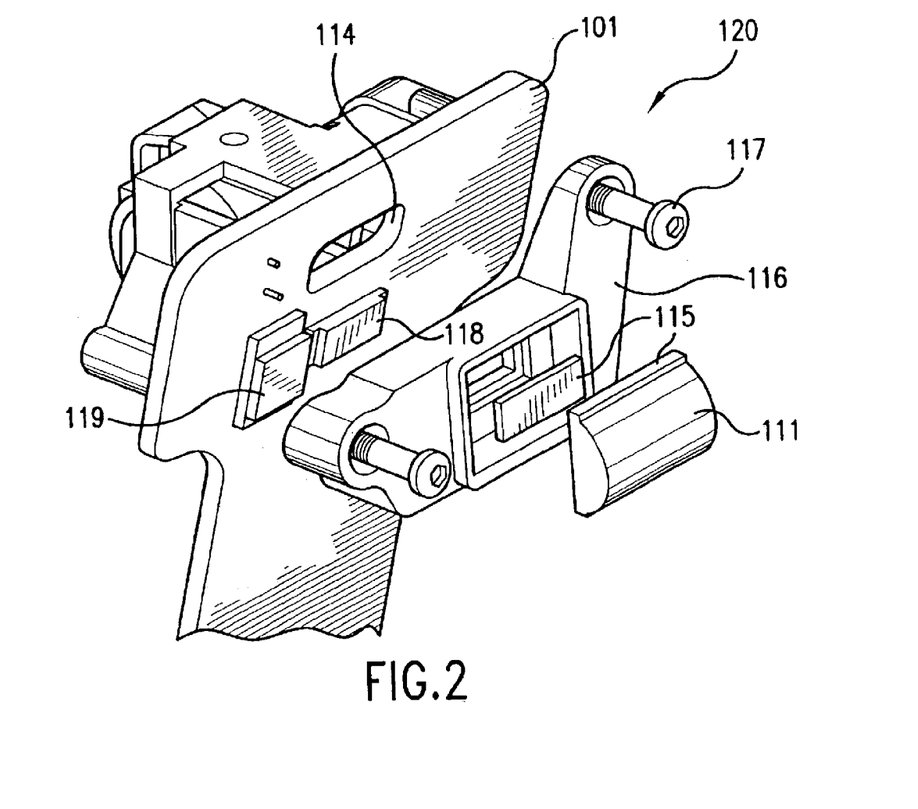
FIG. 2 is an enlarged, broken-away, exploded view of a collection assembly of the reader of FIG. 1.

FIG. 2 shows an exploded view of the collection assembly 120. Shown from right to left are a cylindrical collection lens 111, an optical filter 115, a molded plastic chassis 116, and mounting screws 117. Shown on front side 112 of the PCB are a photodetector 118 and an amplifier 119 which will be enclosed by the chassis 116. The chassis 116 will be coated with nickel (or some similar material) to provide electrical shielding of the photodetector and amplifier. There will be another part (not shown) that will provide electrical isolation between the screws that connect the collection chassis 116 to the scan assembly 300 (through the PCB) described below.

Figure 3:
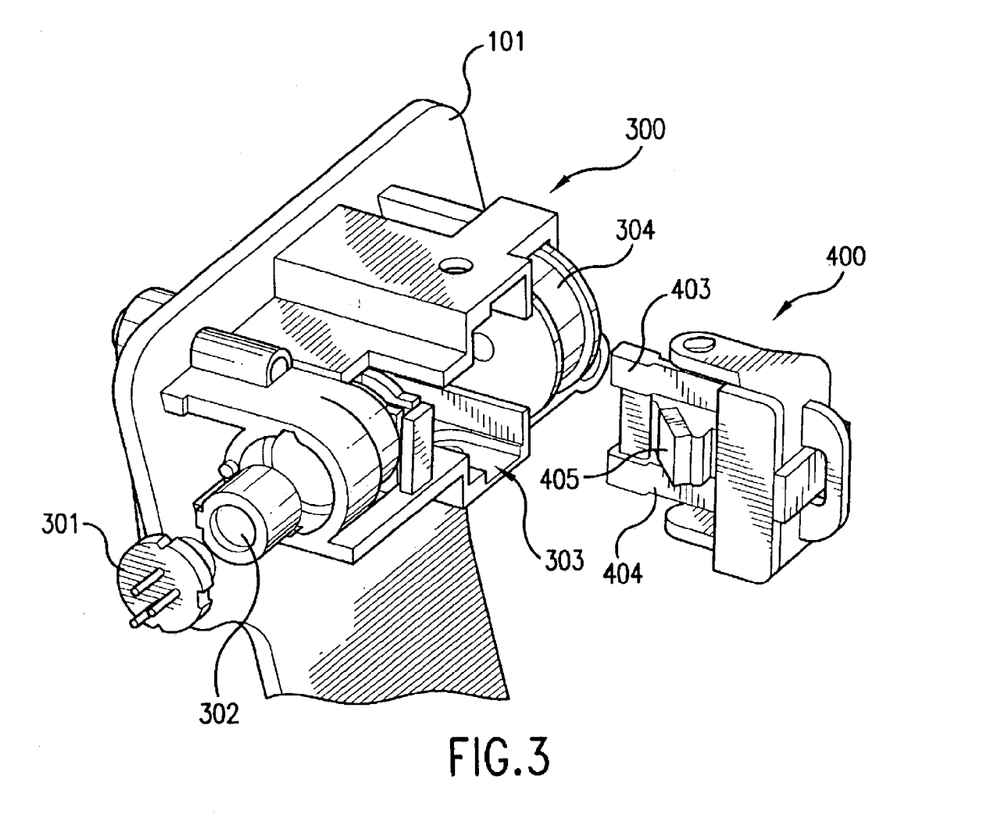
FIG. 3 is an enlarged, broken-away, exploded view of a scan assembly of the reader of FIG. 1.

FIG. 3 is a partially exploded view of the scan assembly 300. The scan assembly includes a laser/motor chassis which is a die cast part allowing the laser to be heat sunk. A laser 301 and a lens 302 are shown exploded to the left. The lens 302 may be a molded design similar to a molded plastic anamorphic lens or a glass lens with a separate injection molded cylindrical connector. To the right is a liquid silicone injection (LSI) molded emitter assembly 400. This assembly 400 slides into a slot 303 in the chassis and snaps in place. Plus or minus five degrees mechanical adjustment is allowable during alignment to get the laser beam in the right location horizontally. The assembly 400 is then bonded in place. The chassis provides containment for shock protection but an additional part has been added to limit movement during a shock event. An electromagnetic coil 304 is trapped in place by the chassis when it is secured to the PCB 101 with the screws 117 from the collection chassis 116.

Figure 4A:
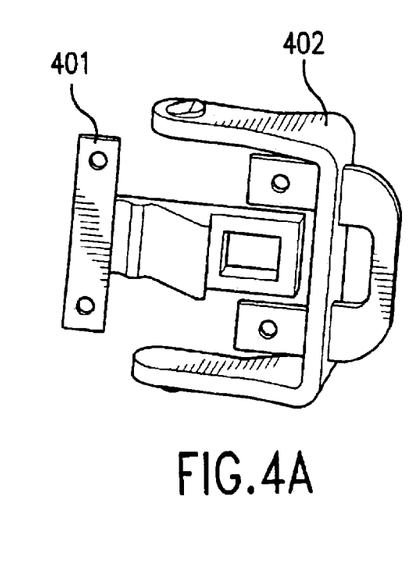
FIGS. 4a, 4b, and 4c are perspective views of an emitter portion of the scan assembly of FIG. 3 in successive stages of fabrication.

FIG. 4a depicts injection molded dynamic 401 and static 402 motor parts of the assembly 400. The dynamic part or rotor 401 will hold a mirror 405 and a magnet 406. The static part or stator 402 will attach to the scan chassis.

Figure 4B:
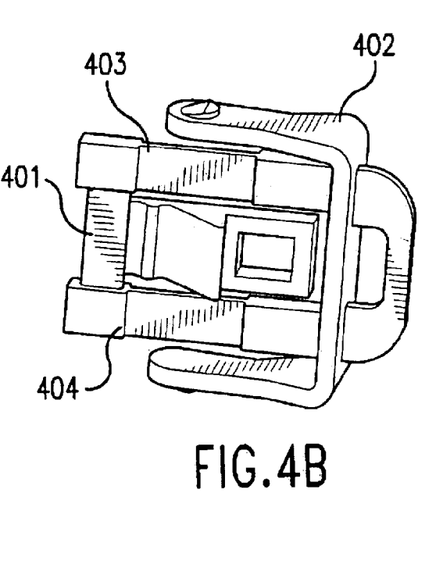

FIG. 4b depicts injection molded parts 403, 404 with additional liquid silicone injection overmolded springs 401 joining the dynamic and static parts.

Figure 4C:
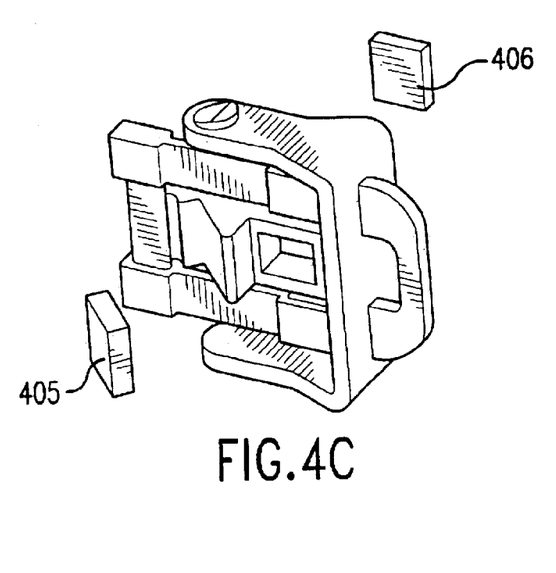

FIG. 4c depicts the mirror 405 and the magnet 406 bonded to the dynamic part 401. An additional shock protector may be added. The assembly 400 is now ready to mate and snap into the scan chassis 300.

The laser diode 301 is operative for producing a light beam which is emitted through lens 302 and impinges on the mirror 405 from which it is reflected through aperture 114 in the PCB 101 exteriorly of the reader 100 in the direction of a target. The beam forms a spot on the target plane at 103. When the mirror 405 is moved, then the spot moves along a line which scans across a bar code symbol. Light is scattered or reflected from the symbol through a window on the reader for collection by lens 111 and detection by the photodetector 118. The drive coil 304 and the magnet 406 interact to move the mirror 405 in response to current changes in the drive coil.

The preferred embodiments of the invention use a mirror as the scanning component which moves to produce the desired scanning motion of the beam spot over the indicia; however, other optical components could be moved. For example, the flexible support structure could support a light emitter (e.g. a laser diode) or an objective focusing lens for reciprocal motion, or both, to produce the scanning motion of the beam spot, as described in U.S. Pat. No. 5,144,120.

INJECTION MOLDED SPRING FABRICATION

As noted above, FIGS. 4a, 4b, 4c are perspective views of the emitter portion 400 of the scan assembly 300 of FIG. 3 in successive stages of fabrication having two injection molded springs.

The use of elastomeric hinges in the design of a motor is known from U.S. Pat. No. 6,173,895 to Plesko.

The present invention further provides a technology to make a motor with a rubber hinge by inserting metal parts into a mold of an injection molding machine, and by injecting rubber into the mold. This is similar to the process used to create a rubber overmold used on housings of bar code readers. Insert molding is also used to create the motor drive coil bobbins with PCB pins used in many bar code readers. In other words, insert molding is a well established technology that has frequently been used for inexpensive, high volume products. Creating the hinge by insert molding provides better consistency than was proposed in U.S. Pat. No. 6,173,895, because it avoids having to trim the rubber off at the top and bottom of the hinge. If it is injection molded, then the hinge can be molded to the desired length, thickness, shape, etc.

The motor assembly is performed in three steps (as shown in FIGS. 4a, 4b, 4c):

1. Provide a family mold of plastic subcomponents 401 and 402 using a very simple mold design.
2. Overmold of silicone flexures 403 and 404 onto the subcomponents 401 and 402.
3. Assemble the mirror 405 and magnet 406 by bonding to parts of the assembly of step 2.

Injection molding the hinge also allows some other things that are not possible with U.S. Pat. No. 6,173,895. For example, the hinge can be molded with a hole or thin spot in the middle, which would reduce the resonant frequency without losing stiffness in the axes that would cause a loop to form in the scan line. Shaping the rubber would allow independent control of stiffness of the hinge in different axes.

Another way to make a motor would be to replace the metal parts with plastic parts. This would allow more complex features to be created than is possible with the thin metal parts used by U.S. Pat. No. 6,173,895. For example, features to mount the stationary end of the hinge to a circuit board, or to the drive coil, or to any other part of the structure of the scan engine would be molded in the hard plastic parts. Features to position the magnet or mirror on the moving part can also be molded in. The rubber hinge can then be between the two plastic parts. A good example of this kind of process can be seen on many toothbrushes presently available that have flexible rubber sections molded into them.

Another possibility is to use metal parts, like the design of U.S. Pat. No. 6,173,895, and then to mold rigid plastic mounting features onto the metal, and to also mold a rubber hinge between two pieces of metal.

The use of injection molded parts, instead of the metal parts used in U.S. Pat. No. 6,173,895, can have some additional benefits. The metal parts are photo-etched out of a sheet of flat material. This means that the entire flexure assembly must be designed as a flat assembly. In other words, the moving end of the flexure that supports the mirror and magnet, the rubber hinge and the stationary end of the flexure are all in a single plane. This is the cause of some disadvantages. For example, the motor of U.S. Pat. No. 6,173,895 is the center of mass of the moving parts of the assembly and is offset from the center of rotation. This is unavoidable in such a planar design. The result of this is that the motor is not balanced. This means that the position of the scan line shifts when the scan line shifts when the scanner is held on its side. The moving parts of the motor droops toward the floor, making the scan line move downward.

This might be acceptable in some non-retro scanner designs, especially if they are laser Class II. A Class II product can have lots of laser power which allows it to have adequate ambient light immunity even if the collection system has a large field of view. However, for relatively inexpensive scanners to be used for consumer applications, one tries to minimize laser power, e.g., 0.2 mw laser power which is suitable for IEC Class I. Industrial scanner engines operate at 0.8 mw, making them Class II. This means one needs to design the collection optics in a non-retro scan to have a field of view as small as possible. Otherwise, ambient light rejection will be inadequate. In order for the field of view to be small, one must know precisely where the scan line is going to be positioned with respect to the engine. If there is uncertainty about scan line position, the field of view must be enlarged to include the entire area over which the scan light might be found. An unbalanced motor design requires the collection field of view to be increased (reducing ambient light immunity), so that the scan line does not move out of the field of view, no matter what position the scanner is in.

If the molded plastic replaces the metal parts in a motor with a rubber hinge, then it becomes possible to mold in features to balance the motor by distributing the weight of the molded parts equally on either side of the center of rotation.

Another advantage of plastic parts in a motor like this is that it can allow the whole motor to package better into a smaller engine. This can be seen by examining an axial engine design. In these engines the scan mirror is positioned so that it is rotated 45 degrees with respect to the face of the drive coil. The mirror on the planar motor design of U.S. Pat. No. 6,173,895 cannot do this. The mirror is parallel to the face of the drive coil.

The laser has to strike the mirror at approximately 45 degrees. This means that the entire planar motor must be rotated 45 degrees with respect to the incoming laser beam. The MCM motor, on the other hand, can have the laser beam directed parallel to the face of the coil. It will then hit the mirror at 45 degrees and be deflected 90 degrees so it projects perpendicular to the face of the motor drive coil. This ability proves to be much better when packing a scanner into a minimum space. It doesn't package nearly as well as a motor with the mirror mounted at 45 degrees to the coil face.

If the mirror mount is injection molded plastic, instead of etched sheet metal, then the mount can be designed to hold the mirror at 45 degrees, allowing the motor to be fit into a smaller scan engine.

The motor according to the present invention may be designed using a silicone LIM spring and operating at approximately 30 Hz (resonant frequency). The stationary motor bracket and dynamic (mirror and magnet) holder may also be injection molded. These two parts may be molded in one family mold, if desired. In one embodiment, the dynamic and static molded parts may be transferred to a liquid silicone injection molding machine to have the spring overmolded to make an integral assembly. The mirror and magnet are then bonded to the dynamic holder. The motor assembly is then fit over a post in the chassis and adjusted for pointing if necessary.

LIM silicones are one group of materials that can be used for the spring in this motor. It is possible that a thermoplastic with a low enough elastic modulus could be used as well. In this case the molded parts may not have to be transferred from a conventional molding machine to a LIM machine to have the spring molded in place. This could be a two-shot process done on one machine with potentially lower fixed cost.

The laser diode 301 may be operated in a continuous "constant power" mode, pulsed, or modulated with different power levels, depending on the specific application. It is also known to provide circuitry to maintain the laser diode at a predetermined output power level using a closed-loop feedback circuit using a monitor photodiode associated with the diode.

The optical subassembly associated with the laser diode may include a focusing lens and/or aperture stop of the following lens types, depending on the application: spherically symmetric glass or plastic lenses; aspheric glass or plastic lenses, rotationally symmetric as well as non-rotationally symmetric around the optical axis, such as cylindrical optical elements including gradient index lenses, Fresnel lenses, binary optical lenses, or multi-level binary optical lenses; lens systems where the lens diameter itself acts as a functional aperture stop for the system; or holographic optical elements, including but not restricted to Fresnel "zone plate" optics.

The subassembly or device of FIG. 1 may be implemented in any type of bar code reader, fixed or portable.

The bar code reader 100 includes a radio transceiver 126 for sending and receiving data, such as inventory data, to and from a master station or a nearby cash register, such as a checkout station or to and from another scanning device. The radio transceiver may be coupled to a local area wireless network as well. Alternately, a cable or cord providing power and data communications may be provided via connector 128. A battery 110 could replace a power cable.

All electronics and optics in this scanner are mounted on the PCB 101 that is located in the handle of the gun shaped housing. There is no additional circuit board. The PCB is oriented such that it lies in a plane extending from the left side to the right side of the handle, as opposed to lying in a plane extending from the front to the back of the handle, as has always been done with the handle boards in all other gun-shaped scanners. This circuit board will have less area for components than the usual orientation because it spans the narrower left-to-right dimension of the handle instead of the larger front-to-back dimension, but this orientation has several advantages that make it worth the extra design effort needed to fit everything on a relatively small circuit board. These advantages will become apparent below.

Several parts of a hand-held scanner need to be in particular parts of the housing for them to best perform their functions. For example, there needs to be a connector mounted at the bottom of the handle into which a cable can be plugged. There also needs to be indicator LEDs located at the top rear part of the housing so they can be visible to the operator when the scanner is held in its normal position. A trigger switch needs to be mounted inside the scanner in a place where it can be pushed by a trigger without the need for complex linkages, and preferably without the need to run wires or a flex circuit to the switch. The circuit board positioned as described above allows the LEDs, trigger switch and cable connector to all be installed on the single circuit board, in their proper places in the housing without the need for any flex circuits etc.

This circuit board orientation also allows the optical components to be mounted on the board and for them to be positioned for optimum scanning performance and minimum assembly labor. For example, the scan motor should be positioned near the back of the housing so the scanned laser can achieve a useable scan line length by the time it reaches the housing nose. The farther back the scan motor is, the less scan angle is needed to fill the nose, and the less rapid the increase of scan line length as it projects into space in front of the housing. This results in a scan line that remains brighter at an increased distance from the scanner, and also results in lower signal frequencies when scanning a symbol positioned far away from the housing. This, in turn, results in longer working range.

This scanner may have non-retro collection optics. The optical assembly may have two collection lenses (and two photodiodes located behind them) positioned one above the other. This is unusual in that all other non-retro scanners have always had the lenses and photodiodes positioned side by side. In addition, all other non-retro scanners have had their collection systems positioned near the nose of the scanner housing. This was to place the collection systems closer to the bar code to increase signal strength. There are, however, some benefits that result from positioning the collection system deeper into the housing.

One advantage is that this allows the use of photodiodes that are surface mounted onto the circuit board, eliminating any hand soldering or manual assembly labor, as would be needed if the photodiodes were mounted vertically at the front edge of a horizontal circuit board, as has been done traditionally. With the collection systems located deep in the housing, they have a clear view of a bar code that is positioned close to, or even in contact with, the nose of the scanner housing. Many users of bar code scanners prefer to use a scanner this way. Non-retro scanners with their collection optics located near the nose of the housing were unable to decode bar codes in contact with the housing nose because the collection optics were unable to see the scan line at this close range. In addition, locating the collection systems far back in the housing minimizes the amount of ambient light that can reach the collection systems. Poor ambient light immunity has traditionally been a weakness of non-retro scanners. Placing the collection systems deep in the housing improves this. This scanner will be able to work in direct sunlight and at all normally encountered levels of artificial lighting.

As mentioned above, many users prefer to use a bar code scanner by positioning the nose of the scanner very close to the bar code. It therefore becomes important to have a scan line that is wide enough at the nose of the scanner to cover the full width of commonly scanned bar codes, such as UPC. Most UPC symbols can be decoded by a scan line that is around 1.75 inches wide. Hence, it is a good idea to design a scanner with a window at the nose that is at least this wide, and to drive the scan motor at a scan angle that completely fills the window. In fact, it is best to drive the scan motor hard enough to provide a scan angle that is more than wide enough to fill the window, because this results in maintaining a spot speed sufficient to decode right to the end of the part of the scan line that escapes through the window. At the ends of the scan line, the laser spot is slowing down and reversing direction. Hence, there is always a little bit of line length at the ends of the scan line that cannot decode a symbol. If these slow ends of the scan line are clipped off by scanning a wider scan angle than the window allows, the entire length of the scan line that is visible to the user is functional, making it more intuitive to use.

It is also important to read long symbols positioned at a distance from the nose of the scanner. It is intuitive for a user to position a scanner far enough from a bar code for the scan line to be long enough to completely cover the bar code. It is not intuitive, however, for a user to position the scanner far enough away to have the scan line be much longer than necessary to cover the bar code. Inexperienced users expect the scanner to read even if the ends of the scan line just touch the first and last bars in the symbol. Designing the scanner to over-scan the window as described above can enable the scanner to work when used this way, but only if the collection system can see all the way to the ends of the scan line. If the two collection systems were positioned side by side, as in conventional designs, each collection system could only see one end of the scan line because the housing would obscure the other end of the scan line. Placing the two collection systems on the center line of the scanner, one above the other, allows each system to see all the way out to both ends of the scan line at any distance from the scanner. This results in a signal amplitude that is as flat as possible across the entire length of the scan line, enabling good performance, even on very long symbols that use the entire length of the scan line. It is particularly important to have a flat signal across the entire length of the scan line if very long low contrast symbols are being scanned.

Another advantage of placing the two collection systems on the center line is that it becomes possible to depopulate one collection system to create a lower performance, and less expensive version of the scanner. For example, a low performance scanner can be built by not installing the lower of the two collection lenses, along with the optical filter and photodiode that would be normally installed behind that lens. In some designs, two amplifiers will be used, one for each photodiode. One of these amplifiers can also be eliminated when building the lower performance/less expensive version with a single collection system. With the collection systems located one above the other, the remaining system sees the entire length of the scan line symmetrically, resulting in an even signal level across the length of the scan line. If the two collection systems were side by side, removing one of them would not be possible because this would result in a very lopsided signal and unacceptable performance.

The PCB is also in a convenient location for mounting the laser and scan motor. The drive coil for the motor can be soldered directly to the circuit board in a conventional way, and the laser can be electrically connected to the PCB. This is known to be a very reliable way to connect the laser, and is much less expensive than using a flex circuit, as is used in many hand-held laser scanners.

In the preferred embodiment, the housing will consist of one plastic part that constitutes the handle and the bottom half of the head of the gun. A second plastic part will form a canopy, or a top cover for the housing and can be molded out of clear plastic. It may be an opaque overmold of rubber-like material. There will be an opening in the overmold to allow the indicator LEDs located near the top edge of the circuit board to be visible through the clear canopy material. This eliminates the need to tool and fasten an additional light pipe component for the LEDs to the canopy, as is done on prior art scanner housings. The trigger will be a third plastic component. It will have an integrally molded spring that will urge the trigger forward when it is not pressed, to keep the trigger from rattling and having a loose, low quality feel. The exit window will be either die cut or laser cut from a flat sheet of plastic.

The circuit board orientation enables very simple final assembly of the circuit board/optical assembly into the housing. The trigger component will be installed into the handle first by dropping it in so that its two pivots engage nests in the housing above, and on either side, of the handle. The circuit board carrying the entire electro-optical assembly is then lowered into the handle, sliding it into track features that are molded into the inside of the handle. The exit window is lowered into slots that are molded into the nose of the housing and then the canopy is lowered onto the handle component, and is fastened in place. The canopy can be retained with two screws and/or with snaps. There will be features on the bottom of the canopy that reach down to the trigger pivots, retaining the trigger in place.

The top edge of the circuit board can touch the inside of the canopy, which will hold the circuit board in place after the canopy has been installed. If desired, a bumper of the same material as the rubber canopy overmold can be molded onto the bottom of the canopy where the top edge of the circuit board touches the canopy. This soft material will compress when pushed against the top edge of the board so it can take up any free space due to dimensional tolerance variations and prevent the board from moving around or rattling in the handle. This rubber bumper will also let the circuit board move a little if the scanner is dropped, helping absorb shock to reduce the chance of damage. After the shock event, the rubber will push the board back to its proper position. The rubber material can also contact the top edge of the window. This will allow the canopy to deflect a little if the scanner is dropped head down on a hard surface, without damaging the window. It is possible to locate the exit window so that is recessed back from the nose of the housing, reducing the likelihood that it might become scratched which would reduce the scanner's performance.

It may be necessary to position ribs on the inside surface of the canopy of a hand-held scanner to intercept laser light reflected off the exit window to keep the light from traveling back to the collection optics. These ribs must be opaque to properly perform this function. If the canopy is molded out of transparent material, as mentioned above, the ribs can be made to be opaque by covering at least one side of the ribs with the rubber-like overmolded material.

Laser scanners require that the motor scan angle and laser power be adjusted during the manufacturing process. In this case, trimpots can be located at the top edge of the circuit board where they are accessible for adjustment even after the circuit board carrying the optical assembly has been lowered into the housing handle. The adjustments can then be made and the scanner tested, with the exit window in place before the canopy is installed. The canopy will only be installed after the scanner has passed its test. This is not possible with most other scanner designs because the trimpots are not accessible with the electro/optical assembly installed in the housing. Even when the trimpots are accessible, it is usually desired to test the scan assembly and the decode board separately before joining them together in the housing, to avoid needing to disassemble the scanner if one of those assemblies is defective. With the single board scanner, this is not necessary.

Other scanners are built on an assembly line that has one station where the scan assembly (unhoused) is placed on a fixture and the motor scan angle and laser power are adjusted. The unhoused scanner is often tested at this station to make sure that it is working properly. It is then passed to another station where it is joined to a decoder board and installed in the housing. The decode board has already been tested at yet another station. The housed scanner is then passed to a third station where it is tested to make sure it was not damaged when being installed in the housing, to make sure the interconnection between the decoder and scan assembly is not defective and to make sure that the exit window in the housing is not defective which could cause poor performance. The single board design allows the operations that would normally be done at three assembly stations to be done at a single station. Redundant testing of the scanner, before and after it is installed in the housing, is also eliminated.

As one can see in FIG. 1 of the drawing, the optical assembly is mounted at an angle at the top of the circuit board, such that the scanning beam projects in a plane that is not perpendicular to the plane of the board. This allows the board to be slanted back at the bottom to accommodate the natural slope of the handle, while still allowing the laser beam to project out the exit window in the expected direction. This is a unique feature of this scanner design of the present invention. It allows the guide rails into which the circuit board slides in the inside of the housing to be made with a simple mold that can be withdrawn from the molded part without expensive cams or slides. If the circuit board were strictly vertical, instead of slanted back at the bottom as shown, the guide rails could not be molded unless the handle was nearly perpendicular to the scan head, which is less comfortable to hold and use and which doesn't look as good.

Other scanners have been built with single circuit boards, but they are different from this design in various ways. For example, the Symbol LS1800 LaserTouch™ scanner has all of its electronics on a single circuit board, but the laser beam is projected parallel to the plane of the board and is deflected out the housing nose by a fold mirror in the scanned laser path. The addition of a fold mirror adds material cost, and also requires an adjustment of the mirror angle to be made. The instant design avoids the need for the fold mirror and its associated adjustment. It also differs from the LS1800 LaserTouch™ scanner in that the orientation of the circuit board is such that it spans the narrow dimension of the housing handle, whereas the board in the LS1800 LaserTouch™ scanner spanned the broader dimension of the housing handle, allowing the use of a much larger circuit board. The LS1800 LaserTouch™ scanner was built as a touch scanner, like many CCD scanners, which is ergonomically different from a gun scanner. A gun shaped scanner is better when used to scan symbols located at a distance from the housing. The ergonomics of a gun shape positions the hand differently on the handle of the scanner, as compared to touch scanners, but this requires that the handle be narrow enough to be gripped by the hand. Touch scanners have broad handles made to be picked up with the finger tips, without wrapping them around the handle. The gun ergonomics allow a circuit board to have more surface area if the board is oriented front to back, as opposed to the present invention which has the board oriented left to right. The left to right orientation is justified, however, despite the reduced circuit board area due to the advantages described above.

The Symbol CS-2000 and CS-1504 scanners also have a single circuit board. These scanners, however, also project the scanned laser beam in a plane that is parallel to the circuit board. They are not gun-shaped scanners, so they are not as well optimized for use in environments where very frequent scanning or scanning from a distance is required. In addition, the circuit board orientation in these scanners has the boards spanning the wide dimension of the housing, not the narrow dimension.

The Welch Allyn IT3800 device is a single board CCD scanner that has a gun shape. It has all electronics and optics mounted on a circuit board in the head of the scanner housing, not in the handle. The scan plane is parallel to the plane of this circuit board. With the circuit board in the head of the gun-shaped housing, the scanner needs to run a flex circuit down the handle to connect to a connector mounted at the bottom of the handle, into which the cable is plugged. This connector needs to be captured by an additional plastic component, which is retained by a screw in the bottom of the handle. The flex circuit needed to plug into another connector mounted on the bottom of the circuit board. These additional parts (the flex circuit, the connector for the flex on the bottom of the circuit board, the connector retainer and the screw) along with the labor to install them are all eliminated by the instant design.

Although the invention has been discussed with reference to certain scanner housings, injection molded motor hinges, triggering mechanisms and other features of the disclosed embodiment, it will be understood that a variety of housing styles and shapes, motor hinges, and triggering mechanisms could be used. Other conventional features of bar code reading systems can also be included, if so desired. The invention is preferably implemented using miniaturized components such as those described herein or in the materials referenced herein, or otherwise known in the art. However, the scanner of the present invention is not limited for use in portable devices and can also be easily adapted for use in a wearable unit, or a stationary housing either of the "table top" or "projection" variety, or so-called conveyer belt or tunnel scanning systems, wherein the item on which the symbol resides is moved across a scanner head.

Additionally, even though the present invention has been described with respect to reading one-dimensional bar codes, it is not limited to such embodiments, but may also be applicable to more complex indicia scanning or data acquisition applications such as two-dimensional bar codes and matrix array symbols comprised of geometric shapes. It is conceivable that the present invention may also find application for use with various machine vision or optical character recognition applications in which information is derived from indicia such as printed characters or symbols, or from the surface or configurational characteristics of the article being scanned.

In addition to being packaged in specific housings, the elements of this invention may be implemented in a very compact assembly or OEM subassembly such as a single integral module or "scan engine". Such a module can interchangeably be used as the dedicated scanning element for a variety of different operating modalities and types of data acquisition systems. For example, the module may be alternatively used in a hand-held manner, in a table top gooseneck scanner attached to a flexible arm or mounting extending over the surface of the table or attached to the underside of the table top, or as a subcomponent or subassembly of a more sophisticated data acquisition system such as a tunnel scanner system.

Each of these different implementations is associated with a different modality of reading bar code or other symbols. Thus, for example, the hand-held scanner is typically operated by the user aiming the scanner at the target; and the table top scanner operated while the target is moved rapidly through the scan field, or presented to a scan pattern which is imaged on a background surface. Still other modalities within the scope of the present invention envision the articles being moved past a plurality of scan modules oriented in different directions so that the field of view allows at least one scan of a symbol which may be arbitrarily positioned on the article.

The module could advantageously comprise various optic subassemblies mounted on a support, and photodetection components, such as a photodiode, or a charge coupled or solid state imaging device. Control or data lines associated with such components may be connected to an electrical connector mounted to enable the module to be electrically connected to a mating connector associated with other elements of the data acquisition system.

An individual module may have specific scanning or decoding characteristics associated with it, e.g., operability at a certain working distance, or operability with one or more specific symbologies or printing densities. The characteristics may also be defined through the manual setting of control switches associated with the module. The user may also adapt the data acquisition system to scan different types of articles or the system may be adapted for different applications by interchanging modules in the data acquisition system through the use of a simple electrical connector.

The scanning module described above may also be implemented within a self-contained data acquisition unit including one or more such components as a keyboard, display, printer, data storage, application software, and databases. Such a unit may also include a communications interface to permit the data acquisition unit to communicate with a host computer, or other components of a data processing system, or with remote computers through a local or wide area network or with the telephone exchange network, either through a modem or an ISDN, XDSL, or cable interface, or by low power radio broadcast from a portable terminal to a stationary or mobile receiver and thereafter to other system components.

It will be understood that each of the features described above, or two or more together, may find a useful application in other types of scanners and readers differing from the types described above.

While the invention has been illustrated and described as embodied in a handheld reader with a single printed circuit board, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

We claim:

1. A scan drive assembly for sweeping a light beam across indicia to be electro-optically read, comprising:

a) a stator having a pair of stator portions symmetrically positioned relative to an axis of symmetry;

b) a rotor having a pair of rotor portions symmetrically positioned relative to the axis of symmetry;

c) a pair of elastomeric springs symmetrically positioned relative to the axis of symmetry and extending in mutual parallelism between the stator portions and the rotor portions, the springs, the stator portions and the rotor portions lying in a common plane;

d) the rotor also having a central portion extending along the axis of symmetry between the springs;

e) a scan mirror mounted on the central portion of the rotor at one side of the common plane between the stator portions and the rotor portions, for reflecting the light beam incident thereon toward the indicia; and f) a drive including a permanent magnet mounted on the central portion of the rotor at an opposite side of the common plane between the stator portions and the rotor portions, for moving the rotor and the scan mirror about an axis of oscillation which extends perpendicular to the central portion.

2. The assembly of claim 1, wherein the springs are leaf springs.

3. The assembly of claim 1, wherein each stator portion and each rotor portion has an aperture in which opposite ends of each spring are received.

4. The assembly of claim 1, wherein the springs are constituted of an overmolded material.

5. The assembly of claim 1, wherein the mirror is positioned at the axis oscillation.

6. The assembly of claim 1, wherein the magnet is positioned at the axis of oscillation.

7. The assembly of claim 1, wherein the central portion has a mounting portion inclined at an inclination angle of 45° relative to the common plane, and wherein the mirror is adhered to the mounting portion.

8. The assembly of claim 1, wherein the stator includes a pair of bracket arms symmetrically positioned relative to the axis of symmetry.

9. The assembly of claim 1, wherein the rotor includes a counterweight situated between the springs.

10. The assembly of claim 1, wherein the mirror and the magnet are situated on opposite sides of the central portion between the springs.

* * * * *